(12) United States Patent
Hasegawa

(10) Patent No.: US 7,948,551 B2
(45) Date of Patent: May 24, 2011

(54) FIELD SEQUENTIAL COLOR CAMERA SYSTEM

(75) Inventor: Takami Hasegawa, Yokohama (JP)

(73) Assignee: JAI Corporation, Yokohama-shi, Kanagawa (JP)

( * ) Notice: Subject to any disclaimer, the term of this patent is extended or adjusted under 35 U.S.C. 154(b) by 410 days.

(21) Appl. No.: 12/223,624

(22) PCT Filed: Feb. 9, 2007

(86) PCT No.: PCT/JP2007/052793
§ 371 (c)(1),
(2), (4) Date: Aug. 5, 2008

(87) PCT Pub. No.: WO2007/094438
PCT Pub. Date: Aug. 23, 2007

(65) Prior Publication Data
US 2009/0059046 A1 Mar. 5, 2009

(30) Foreign Application Priority Data
Feb. 13, 2006 (JP) ................................ 2006-035017

(51) Int. Cl.
*H04N 9/07* (2006.01)
*H04N 5/225* (2006.01)
(52) U.S. Cl. ........................................ 348/336; 348/262
(58) Field of Classification Search .................. 348/262, 348/336, 337, 338, 339
See application file for complete search history.

(56) References Cited

U.S. PATENT DOCUMENTS

| | | | | |
|---|---|---|---|---|
| 4,584,606 A * | 4/1986 | Nagasaki | ...................... | 348/269 |
| 4,926,247 A * | 5/1990 | Nagasaki et al. | ............. | 348/262 |
| 5,014,121 A * | 5/1991 | Hasegawa et al. | ............. | 348/70 |
| 5,255,087 A * | 10/1993 | Nakamura et al. | ............... | 348/71 |
| 5,760,832 A * | 6/1998 | Yamanaka et al. | ............. | 348/264 |
| 6,280,378 B1 * | 8/2001 | Kazuhiro et al. | ............. | 600/160 |
| 6,422,994 B1 * | 7/2002 | Kaneko et al. | ................ | 600/160 |
| 7,179,222 B2 * | 2/2007 | Imaizumi et al. | ............. | 600/109 |
| 7,319,216 B2 * | 1/2008 | Senba | ........................ | 250/201.2 |
| 7,612,822 B2 * | 11/2009 | Ajito et al. | .................... | 348/336 |
| 7,722,534 B2 * | 5/2010 | Cline et al. | .................... | 600/160 |
| 2007/0188650 A1* | 8/2007 | Kobayashi et al. | ........... | 348/344 |

FOREIGN PATENT DOCUMENTS

| | | |
|---|---|---|
| JP | S63-261966 | 10/1988 |
| JP | H02-119006 | 5/1990 |
| JP | H02-182094 | 7/1990 |
| JP | 2001-224015 | 8/2001 |

* cited by examiner

*Primary Examiner* — James M Hannett
(74) *Attorney, Agent, or Firm* — Manabu Kanesaka

(57) ABSTRACT

A filed sequential color camera system includes a color camera, and an illumination unit. The color camera includes a separation optical system to separate an optical image of a subject incident from a lens in two directions; two solid-state imaging devices to convert into electric signals the respective optical images separated in the two directions; an electronic shutter control device to apply sequential exposure control to the two solid-state imaging devices within a time corresponding to a ½ frame for each one frame and at a non-overlapping interval; and a light-emitting sync signal output device to produce a light-emitting sync signal in sync with the sequential exposure control by the electronic shutter control device. The illumination unit receives the light-emitting sync signal from the color camera to emit multicolor light having different wavelength ranges in sync with exposure control of the solid-state imaging devices and in a sequential switch mode.

9 Claims, 3 Drawing Sheets

FIELD SEQUENTIAL COLOR CAMERA SYSTEM

FIELD OF THE ART

The present invention relates generally to a field sequential color TV camera, and more particularly to a filed sequential color camera system that is in sync with field sequential emission illumination of invisible light and visible light to generate color images at two frames.

BACKGROUND ART

A typical prior art field sequential color camera is designed such that a color separation filter is rotated by means of a motor or a light-emitting strobe or diode is allowed to emit light to obtain field sequential color signals which are in turn synthesized into color image signals.

On the other hand, the field sequential color camera is used with infrared or near infrared light added to the emissions R, G and B (red, green and blue) for the purpose of correcting flaws for photographic films, observing the surface and interior of the skin of a human being, or it is used with ultraviolet light added to the emissions with a view to inspecting semiconductor patterns. In this regard, see JP(A)2003-333608.

With a TV camera that takes 1/60 (or 1/30) second to produce one image, however, there are problems that when images are taken in a field sequential mode while R, G, B visible light plus invisible light such as infrared or ultraviolet light are emitted, four frames are needed, and cameras or subjects shake to blur images, or much time is needed for measurement.

In view of such situations, an object of the invention is to provide a field sequential color camera system wherein a light-emitting strobe or diode with R, G, B visible light plus invisible light such as infrared light or ultraviolet light is combined with an illumination unit capable of emissions in a field sequential mode, so that color images of high definitions can be finished and obtained at two frames.

SUMMARY OF THE INVENTION

According to the invention, the aforesaid object is achieved as embodied below.

(1) A filed sequential color camera system, characterized by comprising:
a color camera comprising a separation optical system adapted to separate an optical image of a subject incident from a lens in two directions; two solid-state imaging devices adapted to convert into electric signals the respective optical images separated in said two directions; an electronic shutter control means adapted to apply sequential exposure control to said two solid-state imaging devices within a time corresponding to a 1/2 frame for each one frame and at a non-overlapping interval; and a light-emitting sync signal output means adapted to produce a light-emitting sync signal in sync with the sequential exposure control by said electronic shutter control means, and
an illumination unit adapted to receive said light-emitting sync signal from said color camera to emit light of multiple colors having different wavelength ranges in sync with exposure control of said solid-state imaging devices and in a sequential switch mode.

(2) A field sequential color camera system as recited in (1) above, characterized in that said illumination unit is capable of emitting a plurality of visible light having different wavelength ranges and invisible light such as infrared or ultraviolet radiation in a sequential switch mode.

(3) A field sequential color camera system as recited in (2) above, characterized in that the visible light from said illumination unit corresponds to the red, green and blue three primary colors of a color TV.

(4) A field sequential color camera system as recited in any one of (1) to (3) above, characterized in that said electronic shutter control means applies sequential exposure to said two solid-state imaging devices at equal intervals within a one-frame period and at the same exposure time.

(5) A field sequential color camera system as recited in any one of (1) to (3) above, characterized in that said electronic shutter control means applies sequential exposure to said two solid-state imaging devices at equal intervals within a one-frame period and at any exposure time.

(6) A field sequential color camera system as recited in any one of (1) to (5) above, characterized in that said separation optical system constitutes a two-piece color separation prism having a dichroic film adapted to separate light into a blue-and-green wavelength range and a red-and-infrared wavelength range.

(7) A field sequential color camera system as recited in any one of (1) to (5) above, characterized in that said separation optical system constitutes a two-piece color separation prism having a dichroic film adapted to separate light into an ultraviolet-and-blue wavelength range and a red-and-green wavelength range.

(8) A field sequential color camera system as recited in any one of (1) to (5) above, characterized in that said separation optical system has a half-silvered mirror adapted to separate light at any value in two directions.

(9) A field sequential color camera system as recited in any one of (1) to (8) above, characterized in that said color camera comprises:
two frame memories adapted to simultaneously record a still image produced out of each of said two solid-state imaging device and a light-emitting sync signal from said electronic shutter control means;
a memory output switch means adapted to read the still image recorded in said frame memories repetitively a plurality of times so that said light-emitting sync signal is identified as a still image having an observable time length to produce it in a controlled way; and
an image synthesis means adapted to synthesize said multicolor still images having an observable time length into a color image which is in turn produced to an image output terminal.

(10) A field sequential color camera system as recited in (9) above, characterized in that said image synthesis means is adapted to produce said multicolor still images at the same timing while they are corrected for a time difference between the respective imaging timings.

(11) A field sequential color camera system as recited in (9) or (10) above, characterized in that said memory output switch means is adapted to read one of the still images recorded by said plurality of frame memories repetitively a plurality of times or read it repetitively a plurality of times as an instantaneous still image having an observable time length in order of imaging to produce an output.

The field sequential color camera system of the invention of this application has such advantages as described below.

1. According to the invention of claim 1, the field sequential color camera system is comprised of an electronic shutter control means adapted to apply sequential exposure control to said two solid-state imaging devices within a time corresponding to a ½ frame for each one frame and at a non-overlapping interval, a light-emitting sync signal output means adapted to produce a light-emitting sync signal in sync with the sequential exposure control by said electronic shutter control means, and an illumination unit adapted to receive said light-emitting sync signal to emit light of multiple colors having different wavelength ranges in sync with exposure control of said solid-state imaging devices and in a sequential switch mode. Consequently, the image of a subject illuminated by, for instance, four-color light is captured as a two-color image within a one-frame period, and a four-color image within a two-frame period in sync with the light emitted by said illumination unit and having different wavelength ranges; that is, there can be a less costly double-speed, field sequential color camera system set up that operates twice as fast as a prior art one, and relies upon monochromic solid-state imaging devices to take images at high resolution.

Also, color image signals for an instantaneous still image corresponding to the colors of the subject are obtained at only two frames that run twice as fast as a conventional field sequential color camera: it is possible to achieve fast operation of systems for implementing measurement and sorting depending on the colors of a subject as well as imaging systems.

Further, field sequential images are obtained via the monochromic solid-state imaging devices in sync with the colors of light out of the illumination unit capable of emitting multi-color light having different wavelength ranges in a sequential switch mode; it is possible to set up a small-format, double-speed field sequential color camera system that, without recourse to any color filter and its rotation drive mechanism, can produce color images of high reliability and high quality.

Yet further, if a light emitting strobe or diode is used as the illumination unit for sequential light emission, anything else is not needed for illumination. Especially if the light emitting diode is used, it is then possible to set up a double-speed field sequential color camera system that has an improved flexibility in the configuration and location of the illumination unit, is of compact size, and can produce color images of high reliability and high quality.

At the same time, the aforesaid illumination unit operates such that upon receipt of the emitting sync signal from the aforesaid electronic shutter control means of the inventive field sequential color camera, the light-emitting strobe or diode can be put under on-and-off control in sync with an exposure time within a few µs to ½ frame of the aforesaid solid-state imaging devices for illumination; it is possible to efficiently let in an optical image within the full exposure time of the aforesaid solid-state imaging devices.

Especially upon the short-time emission and exposure of a few µs, if two-color, short-time emission and exposure for B and R is implemented just before the completion of frame and short-time emission and exposure for G (except IR) is implemented just after the start of frame, it is then possible to produce the respective signals for B, R and G within a very short time although the vertical blanking interval is included in it: it is possible to measure three colors B, R and G for measuring signals very fast without waiting one frame.

2. According to the invention as recited in claim 1, there can be the advantage of claim 1 plus the following advantage obtained. That is, the illumination unit may receive the emitting sync signals from the color camera to emit a plurality of visible light having different wavelength ranges and invisible light such as infrared or ultraviolet radiation in sync with the exposure control of the solid-state imaging devices and in a sequential switch mode; for instance, the field sequential color camera system may be used as an imaging system for automatic printers for harnessing infrared light to detect and correct flaws or the like on photographic films, subjects or the like. It is thus possible to set up a less costly field sequential color camera system wherein a single field sequential color camera is used in place of two cameras: a color camera of the NTSC format or the like and an infrared light camera, and operate at least twice as fast as a prior art one.

Referring here to semiconductor device pattern inspectors tapping ultraviolet microscopes, they are likely to get complicated and bulky due largely to the fact that an NTSC or other format color camera and an ultraviolet camera are mounted on a lens barrel divided into two. If the inventive field sequential color camera is used in place of two such cameras, some size reductions are then achievable. It is thus possible to set up a less costly field sequential ultraviolet microscope color camera system.

3. According to the invention recited in claim 3, there can be the advantage of claim 2 plus the following advantage obtained. The visible light from the illumination unit corresponds to the three primary colors, red, green and blue of color televisions; so the colors of the subject can faithfully be taken as still images within a two-frame period.

4. According to the invention recited in claim 4, there can be the advantages of claims 1 to 3 plus the following advantage obtained. The electronic shutter control means implements exposure control such that the two CCDs are sequentially, continuously exposed to light within the one-frame period, at an equal interval and for the same exposure time. For instance, when the subject is at rest, it is then possible to obtain image signals by exposure control at an equal ½ frame time interval and at the maximum sensitivity in an exposure time in the time corresponding to the ½ frame. Alternatively, exposure control can be implemented for a very short time to obtain still images of a fast moving object or pick up an instantaneous timing of fast changing natural phenomena as still images at a certain interval, and obtain image signals at a level depending on the illuminance of the subject.

5. According to the invention recited in claim 5, there can be the advantages of claims 1 to 3 plus the following advantage obtained. The electronic shutter control means implements exposure control such that the two solid-state imaging devices are sequentially, continuously exposed to light at an equal interval within the one-frame period for any exposure time. For instance, with the channel needed for measurement or a blue component channel on which severer restrictions are imposed in terms of emission luminance, CCD sensitivity or the like, it is possible to extend exposure time and implement exposure control such that equivalent level signals are obtained even with other color component channels, thereby obtaining equivalent image signals having improved S/N with every channels.

6. According to the invention recited in claim 6, there can be the advantages of claims 1 to 5 plus the following advantage obtained. With the field sequential color camera system, the separation optical system constitutes a two-piece color separation prism having a dichroic film adapted to separate light into a blue-and-green wavelength range and a red-and-infrared wavelength range so that the optical image of the subject incident from the lens can efficiently be directed to the solid-state imaging devices for each wavelength range. Besides, with the addition of infrared light to the emissions R, G and B, it is possible to use a single field sequential color camera to correct flaws on or in photographic films, observe the surface and interior of the skin of a human being, etc.

7. According to the invention recited in claim 7, there can be the advantages of claims 1 to 5 plus the following advantage obtained. With the field sequential ultraviolet microscope color camera system, the separation optical system constitutes a two-piece color separation prism having a dichroic film adapted to separate light into a ultraviolet-and-blue wavelength range and a red-and-green wavelength range so that the optical image of the subject incident from the lens can efficiently be directed to the solid-state imaging devices for each wavelength range. Besides, with the addition of infrared light to the emissions R, G and B, it is possible to use a single field sequential color camera to inspect semiconductor patterns or the like.

8. According to the invention recited in claim 8, there can be the advantages of claims 1 to 5 plus the following advantage obtained. The separation optical system uses a half-silvered mirror adapted to separate light at any value in two directions; so there can be a less costly optical system provided.

9. According to the invention recited in claim 9, there can be the advantages of claims 1 to 8 plus the following advantage obtained. The still image produced out of each of the two solid-state imaging devices are recorded in two frame memories together with data about color emissions; so it is possible to easily and precisely implement control of repeated reading by the memory output switch means of the still images recorded in the frame memories and control of synthesis by the image synthesis means of the still images into a multicolor image having an observable time length.

It is also possible to implement synthesis by the image synthesis means of still images into a color image having an observable time length, which is in turn produced to the synthesized image output terminal for faithful reproduction and observation of the subject image on a standard type color monitor.

10. According to the invention recited in claim 10, there can be the advantage of claim 10 plus the following advantage obtained. There is the image synthesis means provided wherein, when a moving or rotating subject is imaged, an imaging timing difference, resulting from sequential exposure control by the electronic shutter means of the two solid-state imaging devices at an exposure interval within a ½ frame in a one-frame period, is corrected by reading the multicolor still image out of the frame memories, if required, to produce an image output; so it is possible to easily and inexpensively set up a field sequential color camera system that may be used as a signal-entering field sequential color camera for measuring and sorting systems adapted to implement measurement, sorting or the like depending on the colors of the subject, and observation systems.

11. According to the invention recited in claim 11, there can be the advantages of claims 9 and 10 plus the following advantage. Any one of the still images recorded by said plurality of frame memories is read repetitively a plurality of times based on data about the color emissions to produce an image signal comprising a sequence of the same color signals to the image output terminal so that there can be a still image formed having an observable time length on an external video monitor or, alternatively, a full-color signal for measurement can be fed to an external measurement system in order of imaging.

EXPLANATION OF THE REFERENCE NUMERALS

Figure 1:
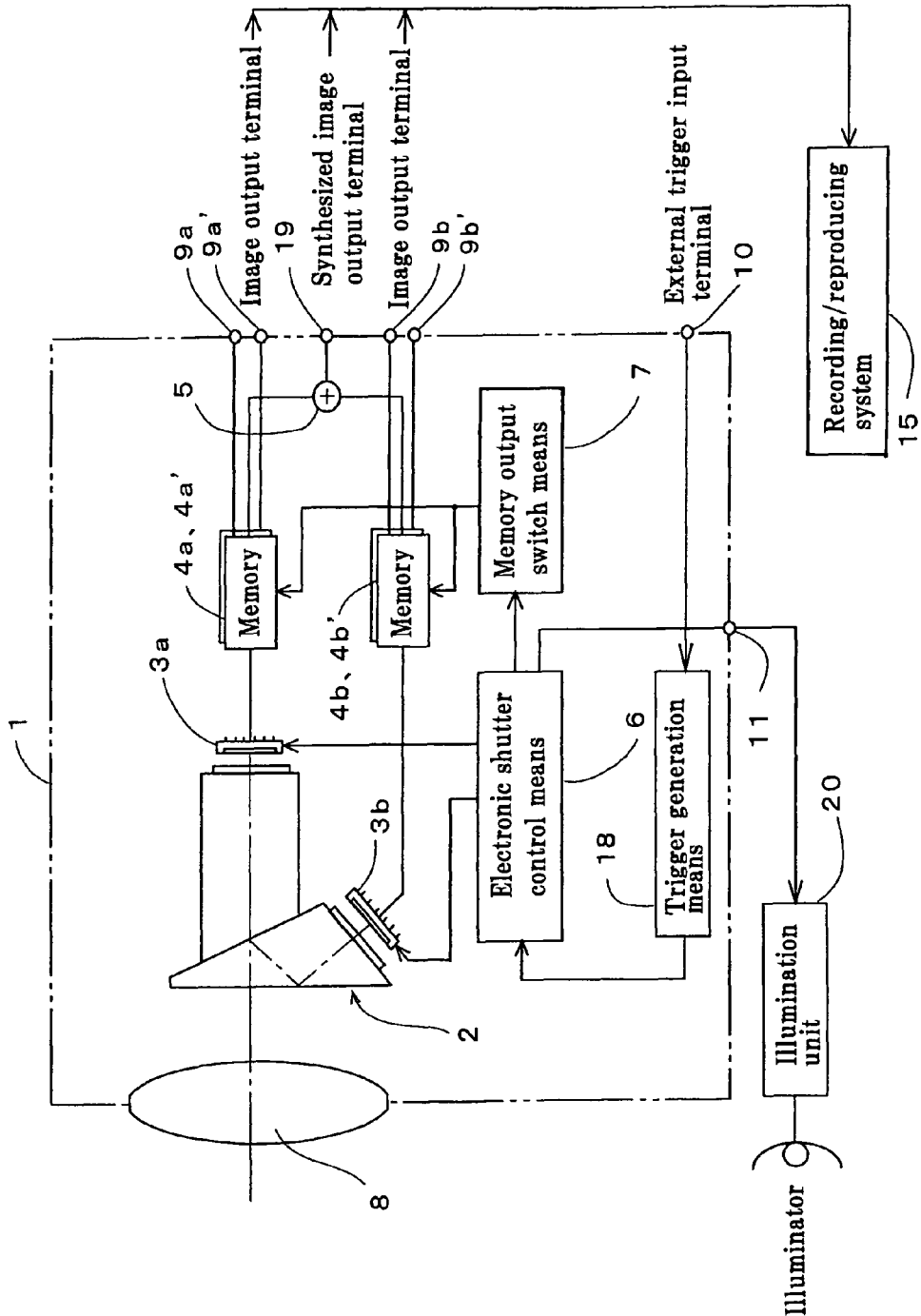
FIG. 1 is illustrative in arrangement of an example of the inventive field sequential color camera system.

1: Field sequential color camera
2: Separation prism
3*a*, 3*b*: CCD
4*a*, 4*a'*, 4*b*, 4*b'*: One-frame memory
5: Image synthesis means
6: Electronic shutter control means
7: Memory output switch means
8: Lens
9*a*, 9*a'*, 9*b*, 9*b'*: Image output terminal
10: External trigger input terminal
11: Emitting sync signal output terminal
15: Recording/reproducing unit
18: Trigger generation means
19: Synthesized image output terminal
20: Illumination unit

BEST MODE FOR CARRYING OUT THE INVENTION

The embodiment of the invention is now explained with reference to examples shown in the drawings.

Figure 2:
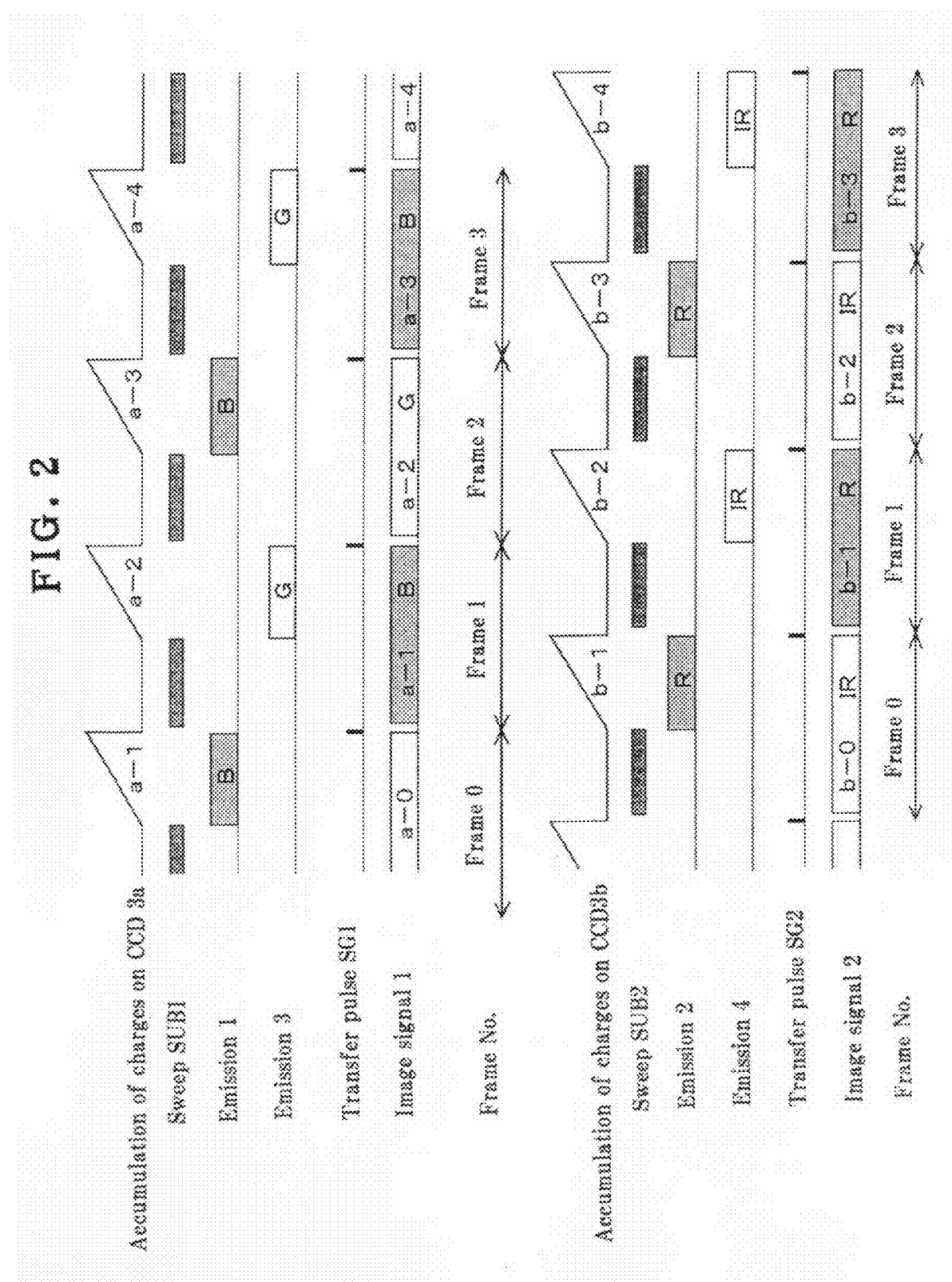
FIG. 2 is representative of the operation of long-time emission and long-time exposure in the field sequential color camera system adapted to produce, within a one-frame period, two still images out of solid-state imaging devices according to an example of the invention.

FIG. 1 is illustrative in arrangement of an example of the inventive field sequential color camera system; FIG. 2 is representative of the operation of long-time emission and long-time exposure in the field sequential color camera system adapted to produce, within a one-frame period, two still images out of solid-state image devices according to an example of the invention; and FIG. 3 is representative of the operation of short-time emission and short-time exposure in the field sequential color camera system adapted to produce, within a one-frame period, two still images out of solid-state image devices according to an example of the invention.

Figure 3:
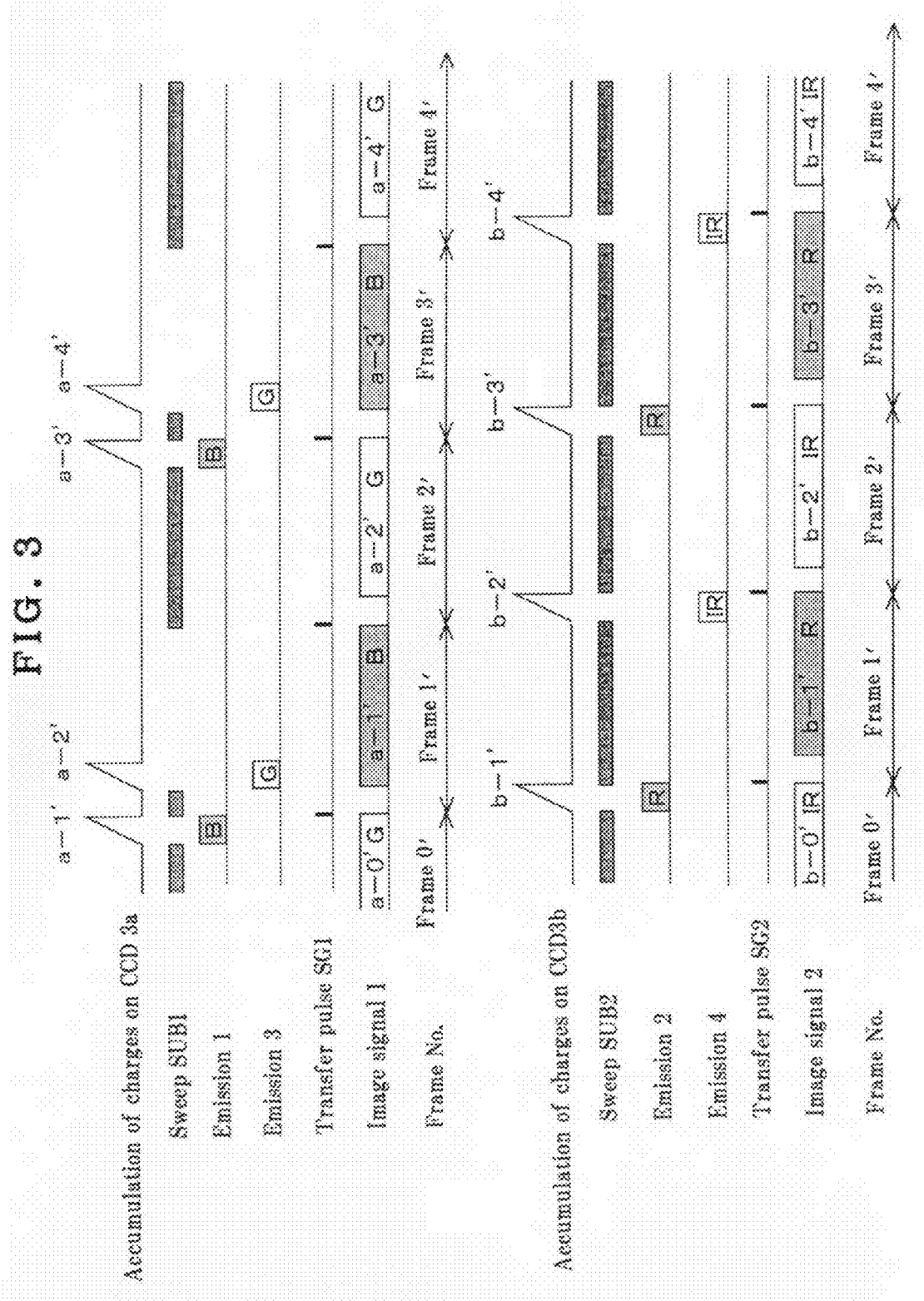
FIG. 3 is representative of the operation of short-time emission and short-time exposure in the field sequential color camera system adapted to produce, within a one-frame period, two still images out of solid-state image devices according to an example of the invention.

Throughout FIGS. 1, 2 and 3, the reference numerals are indicative of:
1: Field sequential color camera
2: Separation prism
3*a*, 3*b*: CCD
4*a*, 4*a'*, 4*b*, 4*b'*: One-frame memory
5: Image synthesis means
6: Electronic shutter control means
7: Memory output switch means
8: Lens
9*a*, 9*a'*, 9*b*, 9*b'*: Image output terminal
10: External trigger input terminal
11: Emitting sync signal output terminal
15: Recording/reproducing unit
18: Trigger generation means
19: Synthesized image output terminal
20: Illumination unit.

EXAMPLES

FIG. 1 is illustrative in arrangement of an example of the inventive field sequential color camera system.

Referring to FIG. 1, the field sequential color camera 1 is built up of a lens 8 adapted to let in an optical image from a subject; a separation prism 2 adapted to separate the subject's image incident from the lens 8 in two directions; two CCDs (solid-state imaging devices) 3a and 3b adapted to implement photoelectric trans-formation of the optical image separated in two directions; an electronic shutter control means 6 adapted to apply to said CCDs 3a and 3b sweep pulses SUB1, SUB2 and transfer pulses SG1, SG2 shown in FIG. 2 to select and control either one of sweep of charges built up on the photoelectric planes of said CCDs 3a and 3b and transfer of them to a vertical transfer register, so that sequential exposure control is implemented in a time corresponding to a ½ frame and at a mutually non-overlapping interval within the same one-frame period; an emitting sync signal output means (not shown) adapted to produce an emitting sync signal in sync with the sequential exposure control of said electronic shutter control means 6; four one-frame memories 4a, 4a', 4b and 4b' adapted to record one each still image within the one-frame period produced out of said CCDs 3a and 3b and one each still image of the next frame; a memory output switch means 7 adapted to read one each of the still images recorded in said four one-frame memories 4a, 4a', 4b and 4b' a plurality of times to convert it into an instantaneous still image having an observable time length or to switch said still images in order of imaging to produce an observable moving picture; image output terminals 9a, 9a', 9b and 9b' for image signals produced out of the memories 4a, 4a', 4b and 4b' controlled by said memory output switch means 7; image synthesis means 5 and an synthesized image output terminal 19 adapted to synthesize image signals produced out of the memories 4a, 4a', 4b and 4b' to produce them as a color image, a trigger generation means 18 adapted to give a startup timing to said electronic shutter control means 6; and an external trigger input terminal 10.

The field sequential color camera system further comprises an illumination unit 20 having an illuminator adapted to receive an emitting sync signal produced out of the field sequential color camera 1 to emit multicolor light having different wavelengths in sync with the electronic shutter control of the field sequential color camera 1 in a sequential switch mode, and a combined recording and reproducing unit 15 that is a recording medium for image output signals of the field sequential color camera 1.

With the field sequential color camera 1 here, the subject's optical image incident from the lens 8 is separated in two directions by a two-piece color separation prism 2 having a dichroic film adapted to separate light into a blue-and-green wavelength range and a red-and-infrared wavelength range, and formed on the photoelectric planes of the two CCDs 3a and 3b, respectively.

As described in conjunction with the prior art, the photoelectric plane of a CCD is always receiving light, and with the imaging of a fast changing subject, an image output is blurred due to an afterimage. For this reason, a CCD-loaded color camera has an electronic shutter function for obtaining clear-cut images. With the field sequential color camera 1 here, there is also a means used that harnesses that electronic shutter function to take two instantaneous still images for 1/60 second (or 1/30 second), which have usually been taken at a rate of one per 1/60 second (or 1/30 second).

This means for taking the two still images for 1/60 second is now explained with reference to FIG. 2 illustrative of long-time emission and long-time exposure within a time corresponding to a ½ frame. As can be seen from FIG. 2, the charge sweep pulses SUB1 and SUB2 are normally added to the aforesaid CCDs 3a and 3b to sweep off the charges built up on photodiodes on the photoelectric planes. Then, at the time at which frame taking is implemented, an external trigger is entered in the trigger generation means 18 via the external trigger input terminal 10 of the field sequential color camera 1 to sequentially stop the application of the charge sweep pulses SUB1 and SUB2 to the CCDs 3a and 3b. First, within the period of frame 0 and in sync with the emission of B (blue) that is the first emission 1, the first accumulation a-1 of charges on the CCD 3a is implemented for any time within the ½ frame, after which the transfer pulse SG1 is added to the CCD 3a to transfer the accumulation a-1 of charges from the photodiodes on the photoelectric plane to the vertical transfer register, where there is a-1B at an image signal 1.

After the completion of the accumulation and transfer of charges on the CCD 3a, in sync with the emission of R (red) that is the second emission 2, the first accumulation b-1 of charges on the CCD 3b is implemented for any time within the ½ frame, after which the transfer pulse SG2 is added to the CCD 3b to transfer the accumulation b-1 of charges from the photodiodes on the photoelectric plane to the vertical transfer register, where there is b-1R at an image signal 2.

Consequently, within the one-frame period of the frame 1, there are a-1B and b-1R generated at the image signals 1 and 2, respectively, so that the respective still images are turned by an analog/digital trans-formation means (not shown) into digital signals, which are in turn recorded in the one-frame memories 4a and 4b (see FIG. 1) together with the emitting sync signals from the emitting sync signal output means within the electronic shutter control means 6.

Subsequently, in sync with the emission of G (green) that is the third emission 3 within the period of a frame 2 in FIG. 2, the second accumulation a-2 of charges on the CCD 3a is implemented for any time within the ½ frame, after which the transfer pulse SG1 is added to the CCD 3a to transfer the accumulation a-2 of charges from the photodiodes on the photoelectric plane to the vertical transfer register, where there is a-2G at the image signal 1.

After the completion of the accumulation and transfer of charges on the CCD 3a, in sync with the emission of IR (infrared or near infrared light) that is the fourth emission 4, the second accumulation b-2 of charges on the CCD 3b is implemented for any time within the ½ frame, after which the transfer pulse SG2 is added to the CCD 3b to transfer the accumulation b-2 of charges from the photodiodes on the photoelectric plane to the vertical transfer register, where there is b-2IR at the image signal 2.

Consequently, within the one-frame period of the frame 2, there are a-2G and b-21R generated at the image signals 1 and 2, respectively, as is the case with the frame 1, so that the respective still images are turned by an analog/digital trans-formation means (not shown) into digital signals, which are in turn recorded in the one-frame memories 4a' and 4b' together with the emitting sync signals from the emitting sync signal output means within the electronic shutter control means 6.

In the same way as described above, the emissions 1 to 4 are repeated and, at the same time, the accumulation, transfer and recording of charges are implemented in sync with the respective color emissions. If the memory output switch means 7 is controlled according to the emitting sync signal colors from the electronic shutter control means 6 to read still images from the frame memories 4a, 4a', 4b and 4b' a plurality of times, it is then possible to send them to the image output terminals 9a, 9a', 9b and 9b' as an image signal comprising a sequence of the same color signals so that they are turned into still images having a time length observable on an external monitor. Alternatively, it is possible to switch them in order of imaging: in order of B, G/R and IR to feed a full-color signal for measurement to an external measurement unit.

At the same time, the image synthesis means 5 works synthesizing three color signals in the NTSC or other mode corresponding to the R+G+B three primary colors for color televisions to send a sequence of color synthesized image signals to the synthesized image output terminal 19.

Suppose here that the electronic shutter control means 6 implements exposure control such that the two CCDs 3a and 3b are sequentially, continuously exposed to light within the one-frame period, at an equal interval and for the same exposure time. For instance, when the subject is at rest, it is then possible to obtain image signals by exposure control at an equal ½ frame time interval and at the maximum sensitivity in an exposure time in the time corresponding to the ½ frame. Alternatively, exposure control can be implemented for a very short time to obtain still images of a fast moving object or pick up an instantaneous timing of fast changing natural phenomena as still images at a certain interval, and obtain image signals at a level depending on the illuminance of the subject.

The electronic shutter control means 6 implements exposure control such that the two solid-state imaging devices are sequentially, continuously exposed to light at an equal interval within the one-frame period for any exposure time. For instance, with the channel needed for measurement or a blue component channel on which severer restrictions are imposed in terms of emission luminance, CCD sensitivity or the like, it is possible to extend exposure time and implement exposure control such that equivalent level signals are obtained even with other color component channels, thereby obtaining equivalent image signals having improved S/N with every channel.

Although inferior in terms of the efficiency of use, it is understood that for the spectral prism 2, there may be a half-silvered mirror that separate light equally or at any value in two directions.

To take images of a moving or rotating subject, the field sequential color camera system comprises the image synthesis means 5 adapted to read the multicolor still images recorded in the frame memories 4a, 4a', 4b and 4b', thereby correcting imaging timing differences resulting from the sequential exposure control by the electronic shutter control means 6 of the two CCDs 3a and 3b within the one-frame period and at an exposure interval of up to ½ frame.

Likewise, short-time emission and short-time exposure for taking two still images at one frame are now explained with reference to FIG. 3.

As can be seen from FIG. 3, the charge sweep pulses SUB1 and SUB2 are normally added to the aforesaid CCDs 3a and 3b to sweep off the charges built up on photodiodes on the photoelectric planes. Then, at the time at which frame taking is implemented, an external trigger is entered in the trigger generation means 18 via the external trigger input terminal 10 of the field sequential color camera 1 to sequentially stop the application of the charge sweep pulses SUB1 and SUB2 to the CCDs 3a and 3b. First, within the period of frame 0' in FIG. 3 and in sync with the short-time emission of B (blue) that is the first emission 1, the first short-time accumulation a-1' of charges on the CCD 3a is implemented, after which the transfer pulse SG1 is added to the CCD 3a to transfer the short-time accumulation a-1' of charges from the photodiodes on the photoelectric plane to the vertical transfer register, where there is a-1'B at an image signal 1.

After the completion of the accumulation and transfer of charges on the CCD 3a, in sync with the short-time emission of R (red) that is the second emission 2, the first short-time accumulation b-1' of charges on the CCD 3b is implemented, after which the transfer pulse SG2 is added to the CCD 3b to transfer the short-time accumulation b-1' of charges from the photodiodes on the photoelectric plane to the vertical transfer register, where there is b-1'R at an image signal 2.

Consequently, within the one-frame period of the frame 1', there are a-1'B and b-1'R generated at the image signals 1 and 2, respectively, so that the respective still images are turned by an analog/digital trans-formation means (not shown) into digital signals, which are in turn recorded in the one-frame memories 4a and 4b (see FIG. 1) together with the emitting sync signals from the emitting sync signal output means within the electronic shutter control means 6.

Subsequently, in sync with the short-time emission of G (green) that is the third emission 3 within the period of a frame 2' in FIG. 3, the second short-time accumulation a-2' of charges on the CCD 3a is implemented, after which the transfer pulse SG1 is added to the CCD 3a to transfer the short-time accumulation a-2' of charges from the photodiodes on the photoelectric plane to the vertical transfer register, where there is a-2'G at the image signal 1.

After the completion of the accumulation and transfer of charges on the CCD 3a, in sync with the short-time emission of IR (infrared or near infrared light) that is the fourth emission 4, the second short-time accumulation b-2' of charges on the CCD 3b is implemented, after which the transfer pulse SG2 is added to the CCD 3b to transfer the short-time accumulation b-2' of charges from the photodiodes on the photoelectric plane to the vertical transfer register, where there is b-2'IR at the image signal 2.

Consequently, within the one-frame period of the frame 2', there are a-2'G and b-2'1R generated at the image signals 1 and 2, respectively, as is the case with the frame 1', so that the respective still images are turned by an analog/digital trans-formation means (not shown) into digital signals, which are in turn recorded in the one-frame memories 4a' and 4b' together with the emitting sync signals from the emitting sync signal output means within the electronic shutter control means 6.

In the same as described above, the emissions 1 to 4 are repeated and, at the same time, the accumulation, transfer and recording of charges are implemented in sync with the respective color emissions. If the memory output switch means 7 is controlled according to the emitting sync signal colors from the electronic shutter control means 6 to read still images from the frame memories 4a, 4a', 4b and 4b' a plurality of times, it is then possible to send them to the image output terminals 9a, 9a', 9b and 9b' as an image signal comprising a sequence of the same color signals so that they are turned into still images having a time length observable on an external monitor. Alternatively, it is possible to switch them in order of imaging: in order of B, G/R and IR to feed a full-color signal for measurement to an external measurement unit.

Especially upon the short-time emission and exposure of a few µs, if two-color, short-time emission and exposure for B and R is implemented just before the completion of the frame and short-time emission and exposure for G (except IR) is implemented just after the start of the frame, it is then possible to produce the respective signals for B, R and G within a very short time although the vertical blanking interval is included in it: it is possible to measure three colors B, R and G for measuring signals very fast without waiting one frame.

In the foregoing embodiments, while the two-piece color separation prism comprising a dichroic film adapted to separate light into a blue-and-green wavelength range and a red-and-infrared wavelength range is used as the light separation prism 2, it is understood that use may be made of a two-piece color separation prism comprising a dichronic film adapted to separate light into an ultraviolet-and-blue wavelength range and a red-and-green wavelength range. In that case, the explanation of FIGS. 1, 2 and 3 may be read in order of G→UV (ultraviolet)→IR→G.

In the invention, there is the need of using the CCDs in combination with moiré-preventive quartz low-pass filters located before and after the separation prism 2, a trimming filter adapted to cut off extra colors and improve on color reproducibility, the correlated double sampling circuit necessary for the signal amplification circuit of a CCD, a gamma correction circuit, etc.; however, known arts taking no part in the invention are not described or illustrated.

INDUSTRIAL APPLICABILITY

With the prior art field sequential color camera, one screen is obtained over four frames whereas, in the inventive field sequential color camera system, color image signals for an instantaneous still image depending on the colors of the subject are obtained at a speed double as fast and within a two-frame period. Especially with infrared or near infrared light added to color emissions R, G and B (red, green and blue), it is possible to correct flaws for photographic films, and observe the surface and interior of the skin of a human being. With ultraviolet light added, it is possible to inspect semiconductor patterns.

What is claimed is:

1. A filed sequential color camera system, comprising:
   a color camera comprising a separation optical system adapted to separate an optical image of a subject incident from a lens in two directions; two solid-state imaging devices to convert into electric signals the respective optical images separated in the two directions; an electronic shutter control means to apply sequential exposure control to said two solid-state imaging devices within a time corresponding to a ½ frame for each one frame and at a non-overlapping interval; and a light-emitting sync signal output means to produce a light-emitting sync signal in sync with the sequential exposure control by said electronic shutter control means, and
   an illumination unit to receive said light-emitting sync signal from said color camera to emit multicolor light having different wavelength ranges in sync with exposure control of said solid-state imaging devices and in a sequential switch mode,
   wherein said color camera further comprises:
   two frame memories to simultaneously record a still image produced out of each of said two solid-state imaging device and an emitting sync signal from said electronic shutter control means;
   a memory output switch means to read the still image recorded in said frame memories repetitively a plurality of times so that said emitting sync signal is identified as a still image having an observable time length to produce it in a controlled way; and
   an image synthesis means to synthesize said multicolor still images having an observable time length into a color image which is in turn produced to an image output terminal, said image synthesis means producing said multicolor still images at the same timing while they are corrected for a time difference between the respective imaging timings.

2. A field sequential color camera system as recited in claim 1, wherein said illumination unit is capable of emitting a plurality of visible light having different wavelength ranges and invisible light including infrared or ultraviolet radiation in a sequential switch mode.

3. A field sequential color camera system as recited in claim 2, wherein the visible light from said illumination unit corresponds to red, green and blue three primary colors of a color TV.

4. A field sequential color camera system as recited in claim 1, wherein said electronic shutter control means applies sequential exposure to said two solid-state imaging devices at equal intervals within a one-frame period and at the same exposure time.

5. A field sequential color camera system as recited in claim 1, wherein said electronic shutter control means applies sequential exposure to said two solid-state imaging devices at equal intervals within a one-frame period and at any exposure time.

6. A field sequential color camera system, comprising:
   a color camera comprising a separation optical system adapted to separate an optical image of a subject incident from a lens in two directions; two solid-state imaging devices to convert into electric signals the respective optical images separated in the two directions; an electronic shutter control means to apply sequential exposure control to said two solid-state imaging devices within a time corresponding to a ½ frame for each one frame and at a non-overlapping interval; and a light-emitting sync signal output means to produce a light-emitting sync signal in sync with the sequential exposure control by said electronic shutter control means, and
   an illumination unit to receive said light-emitting sync signal from said color camera to emit multicolor light having different wavelength ranges in sync with exposure control of said solid-state imaging devices and in a sequential switch mode,
   wherein said separation optical system constitutes a two-piece color separation prism having a dichroic film adapted to separate light into a blue-and-green wavelength range and a red-and-infrared wavelength range.

7. A field sequential color camera system, comprising:
   a color camera comprising a separation optical system adapted to separate an optical image of a subject incident from a lens in two directions; two solid-state imaging devices to convert into electric signals the respective optical images separated in the two directions; an electronic shutter control means to apply sequential exposure control to said two solid-state imaging devices within a time corresponding to a ½ frame for each one frame and at a non-overlapping interval; and a light-emitting sync signal output means to produce a light-emitting sync signal in sync with the sequential exposure control by said electronic shutter control means, and
   an illumination unit to receive said light-emitting sync signal from said color camera to emit multicolor light having different wavelength ranges in sync with exposure control of said solid-state imaging devices and in a sequential switch mode,
   wherein said separation optical system constitutes a two-piece color separation prism having a dichroic film adapted to separate light into an ultraviolet-and-blue wavelength range and a red-and-green wavelength range.

8. A field sequential color camera system as recited in claim 1, wherein said separation optical system has a half-silvered mirror adapted to separate light at any value in two directions.

9. A field sequential color camera system, comprising:

a color camera comprising a separation optical system adapted to separate an optical image of a subject incident from a lens in two directions; two solid-state imaging devices to convert into electric signals the respective optical images separated in the two directions; an electronic shutter control means to apply sequential exposure control to said two solid-state imaging devices within a time corresponding to a ½ frame for each one frame and at a non overlapping interval; and a light-emitting sync signal output means to produce a light-emitting sync signal in sync with the sequential exposure control by said electronic shutter control means, and an illumination unit to receive said light-emitting sync signal from said color camera to emit multicolor light having different wavelength ranges in sync with exposure control of said solid-state imaging devices and in a sequential switch mode, wherein said color camera further comprises:

two frame memories to simultaneously record a still image produced out of each of said two solid-state imaging device and an emitting sync signal from said electronic shutter control means;

a memory output switch means to read the still image recorded in said frame memories repetitively a plurality of times so that said emitting sync signal is identified as a still image having an observable time length to produce it in a controlled way; and an image synthesis means to synthesize said multicolor still images having an observable time length into a color image which is in turn produced to an image output terminal, said memory output switch means reading one of the still images recorded by said plurality of frame memories repetitively a plurality of times or reading it repetitively a plurality of times as an instantaneous still image having an observable time length in order of imaging to produce an output.

* * * * *